United States Patent [19]

Wardman et al.

[11] 4,222,241

[45] Sep. 16, 1980

[54] SOLAR AND WIND ENERGIZED POWER GENERATION DEVICE

[76] Inventors: John C. Wardman, 1060 San Tomas Aquino Rd., Campbell, Calif. 95008; James Y. Adams, 26966 W. Fremont Rd., Los Altos Hills, Calif. 94022

[21] Appl. No.: 2,671

[22] Filed: Jan. 11, 1979

[51] Int. Cl.[3] .................................................. F03G 7/02
[52] U.S. Cl. ......................................... 60/641; 60/325; 60/531; 417/379
[58] Field of Search ................. 60/641, 325, 527, 530, 60/531; 417/379, 393

[56] References Cited

U.S. PATENT DOCUMENTS

| | | | |
|---|---|---|---|
| 2,688,922 | 9/1954 | Bonaventura et al. | 60/641 |
| 4,041,707 | 8/1977 | Spector | 417/379 X |
| 4,081,966 | 4/1978 | de Geus | 60/641 |
| 4,150,923 | 4/1979 | Wardman | 60/641 X |

Primary Examiner—Allen M. Ostrager
Assistant Examiner—Stephen F. Husar

[57] ABSTRACT

An apparatus for generating power from the temperature difference between two bodies of fluid, one of which is heated by trapping solar energy in a dome and the other one of which is cooled by wind passing beneath an airfoil. A pair of heat exchange basins are provided into which hot and cold fluid is supplied, with heat exchange coils disposed therein for developing a differential pressure which is transmitted to opposite sides of a piston. The fluid temperature in each heat exchange basin is reversed by gravitational action so that piston motion can be reversed for pumping action.

22 Claims, 8 Drawing Figures

SOLAR AND WIND ENERGIZED POWER GENERATION DEVICE

BACKGROUND OF THE INVENTION a. Field of the Invention

The invention relates generally to apparatus for generating power from the combined energy of the wind and the sun.

b. Prior Art

There are many well known power generation devices that convert the energy of the wind or solar energy into another, more convenient, form of energy, such as electrical energy or rotary mechanical energy. Common examples of devices utilizing wind energy are the wind powered generators and the wind powered water pumps found on many farms and ranches throughout the world.

There are also a great number of power generation devices which convert solar energy into another, more easily utilized energy form. One common method for converting solar energy into mechanical energy is to use solar energy to create a tempereature difference between two or more bodies of fluid (or between a body of fluid and the ambient environment) that can be used to actuate bellows, pistons or other devices. Examples of solar energized devices of this type are found in the disclosures of Bonaventura et al. in U.S. Pat. No. 2,688,923, Sherock in U.S. Pat. No. 3,112,862, Green in U.S. Pat. No. 3,023,167, Booth in U.S. Pat. No. 3,309,012, Schuman in U.S. Pat. No. Re. 27,740, Thureau et al. in U.S. Pat. No. 3,937,599, Kirsten in U.S. Pat. No. 3,972,651, Lapeyere in U.S. Pat. No. 3,304,985 and Neidigh in U.S. Pat. No. 3,989,417.

A somewhat different mechanism utilizing the same principle as the devices of the above cited patents is disclosed in U.S. Pat. No. 4,041,707 of Spector which teaches a device that utilizes the temperature difference between the surface water and the water of the lower depths of a large, naturally occurring body of water. A piston is energized by air heated or cooled within heat transfer coils that are disposed both near the top and bottom of the body of water.

All of the above cited patents disclose devices which utilize solar energy to heat a body of fluid so that its temperature can be raised above that of another body of fluid. None of the above devices, however, attempt to lower the temperature of a body of fluid so as to further increase the magnitude of the temperature difference.

In U.S. Pat. No. 4,068,476 of Kelsey, a power unit is disclosed which uses a solar evaporator to power a hydraulic pump that drives a hydraulic motor. Thus, Kelsey's device differs from previously cited devices in that it utilizes solar generated gaseous vapors to perform mechanical work rather than the temperature difference between two bodies of fluid or between a body of fluid and the ambient environment.

A problem the prior art has not adequately addressed is how to provide a temperature difference type power generation device that utilizes solar energy to heat a first body of fluid and wind energy to cool a second body of fluid so as to maximize the temperature difference between the bodies of fluid and to increase the potential power output of the device. One approach is described in my copending U.S. patent application Ser. No. 898,299, now U.S. Pat. No. 4,150,923.

SUMMARY OF THE INVENTION

An object of this invention is to produce a device which utilizes both sun and wind energy to accomplish useful work.

It is a further object of this invention to use the sun's energy to heat a first body of fluid and the wind's energy to cool a second body of fluid so as to create a relatively large temperature difference between the two bodies of fluid.

A further object of this invention is to produce a device in keeping with the above objects which is also simple in construction and reliable in operation.

Briefly, the invention includes a fluid tank divided into several fluid filled reservoirs, a small motor for rocking the tank back and forth about a centrally located pivotal axis, valves for alternately directing heated and cooled fluid from the reservoirs through alternately and oppositely hot and cold heat exchange basins, a greenhouse type dome covering those reservoirs that are to be heated, an air foil disposed over those reservoirs that are to be cooled, a heat transfer coil filled with a volatile working fluid and disposed within each heat transfer basin, a pump powered by the vapor pressure difference of the volatile fluid between the heat transfer coils within the hot and cold heat exchange basins for doing useful work, such as driving a hydraulic motor powered by pressurized hydraulic fluid output from the pump. Solar energy heats the fluid within the hot fluid reservoirs and the wind, directed and accelerated by the airfoils, cools the fluid within the cold fluid reservoirs. The temperature difference between reservoirs is captured in the basins and used to cause the volatile working fluid to do useful work.

DESCRIPTION OF THE PREFERRED EMBODIMENT

Figure 1:
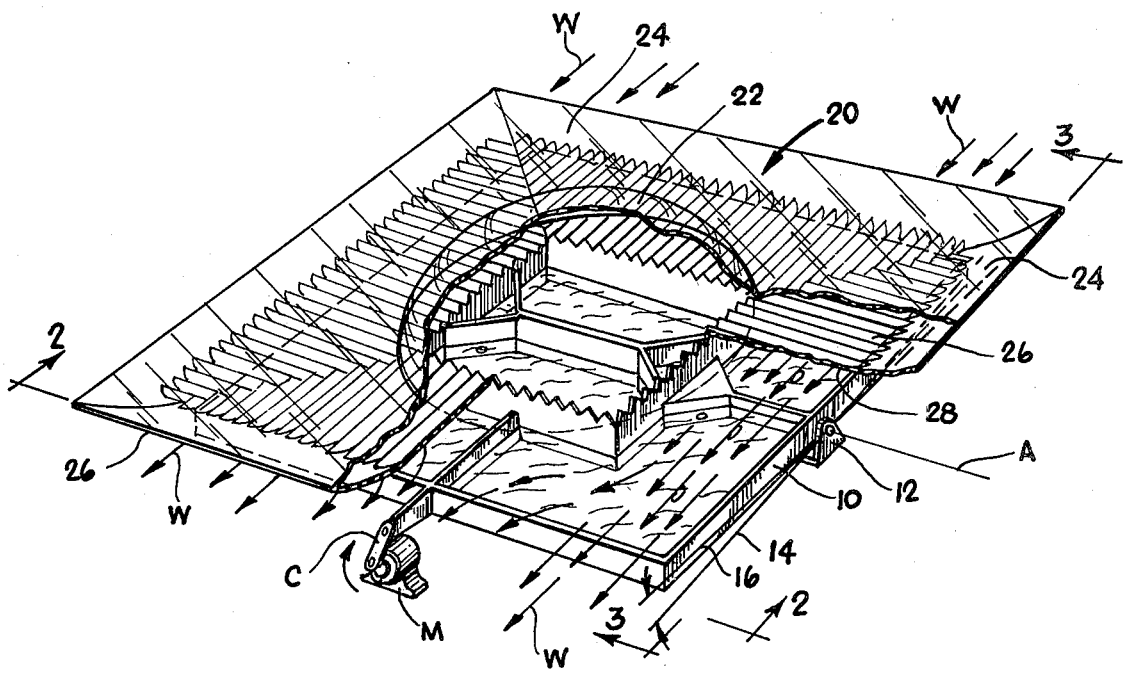
FIG. 1 is a partially cut away perspective view of one embodiment of the present invention.

In FIG. 1, a solar and wind energized power system is shown to include a fluid tank 10 which has a pivotal axis A defined by an elongated fulcrum 12. The fulcrum permits the tank to be rocked between a first tilted position, indicated by line 14 and a second tilted position, indicated by line 16. The tank can be constructed from fiber glass or from any corrosion-proofed material.

Figure 4:
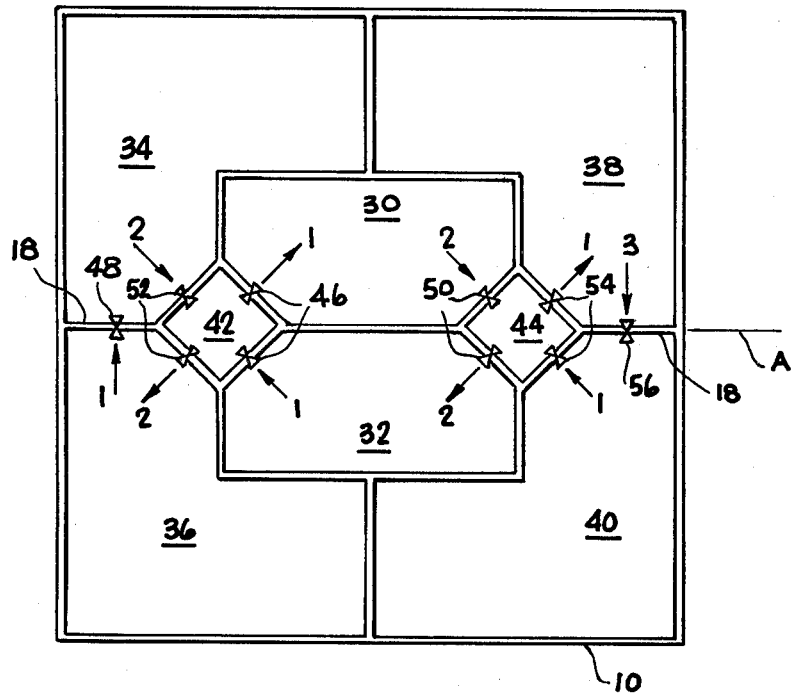
FIG. 4 is a plan view of the fluid tank of the device shown in FIG. 1.

The fluid tank 10 is divided into a plurality of fluid containing reservoirs by means of a plurality of walls 18 (see also FIG. 4). The reservoirs, which contain either heated or cooled fluid, are covered by cover 20 which is designed to heat the fluid within certain ones of the reservoirs and to cool the fluid within certain other ones of the reservoirs. Each of the reservoirs, when level, is filled to approximately 25% of its capacity with a fluid, water, or a mixture of water and antifreeze as required by the climate.

Figure 2:
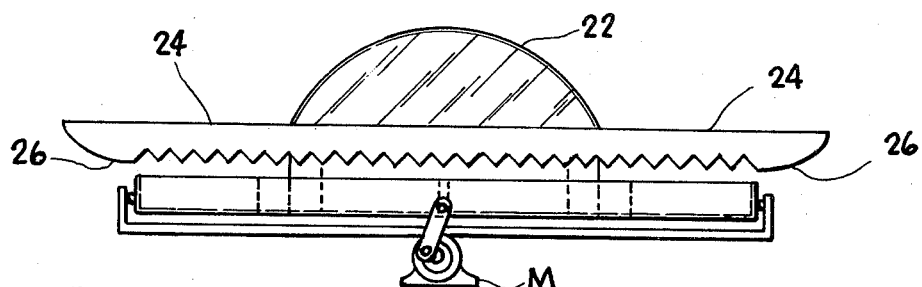
FIG. 2 is an end elevational view taken along line 2—2 of FIG. 1.
Figure 3:
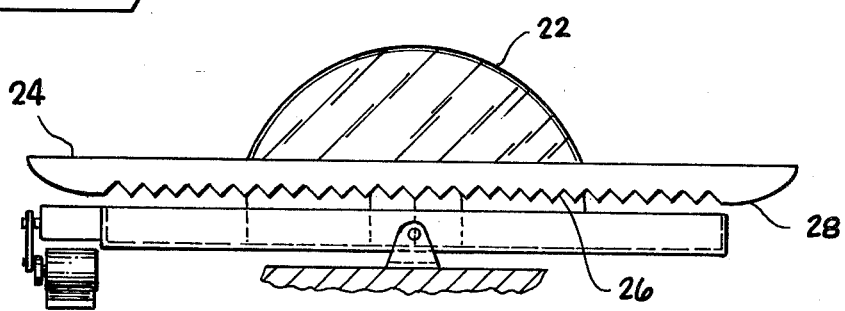
FIG. 3 is a side elevational view taken along line 3—3 of FIG. 1.

As seen in FIGS. 2 and 3, cover 20 includes a dome portion 22 and hollow airfoil portion 24. The entire upper surface of the cover is translucent or painted to trap heat. Corrugated lower portion 26 of the airfoils is, on the other hand, opaque so that no sunlight is transmitted therethrough. Since the dome and the upper surfaces of the airfoils transmit solar energy, the air trapped beneath the dome is heated by the "greenhouse" effect, which, in turn, heats fluid contained within the reservoirs under the dome. On the other hand, the fluid within the reservoirs beneath airfoil portions of the cover are shaded from the heating effects of solar radiation by the opaqueness of corrugated portions 26. However, the fluid in the hot fluid reservoir need not necessarily be above ambient temperature. The fluid therein is cooled in the heat exchange basins, described below, and ambient temperature, perhaps enhanced by trapped heat from solar radiation replaces the energy given up. Solar radiation is not essential to operation of the present apparatus, as long as a temperature difference can be established in the heat exchange basins.

As seen in FIGS. 1–3, the cambered shape 28 of corrugated portion 26 is reminiscent of an inverted airplane wing. By Bernouilli's principle, the wind flow W passing over the cambered surface 28 will have a higher wind speed than the wind passing over the upper surface of the airfoils. Due to the wind chill factor, the wind flowing over the cold fluid reservoirs of the tank increases the rate at which heat is to be carried away from the fluid. The corrugated portions 26 create a wind turbulence which further increases the rate of heat removal from the fluid.

The fluid reservoirs beneath the dome portions of the cover are preferably sealed by a highly thermally conductive material, such as sheet metal, so that the fluid disposed therein will not be lost due to evaporation. However, the preferred mode of construction is to leave the reservoirs beneath the airfoil portions uncovered. The airfoil portions are cantilevered from the walls joining the dome portion to the boundary wall between the central hot fluid reservoirs and the peripheral cold water reservoirs. The reservoirs are periodically refilled as the fluid evaporates, the wind W will further chill the fluid due to the effects of evaporation.

Thus, it can be seen how cover 20 will heat the fluid in the reservoirs covered by dome portion 22 and cool the fluid covered by airfoil portions 24. It will be seen, with reference to FIG. 4, how the temperature difference between the cooled fluid and the heated fluid can be used to power a motor capable of doing useful work.

In FIG. 4, fluid tank 10 is seen to be divided into six fluid reservoirs by means of seven walls 18. Reservoirs 30 and 32 are covered by dome portion 22 and are thus heated by solar energy. Reservoirs 30, 32 are preferably square in their combined surface shape and should have at least one third of the surface area within the square perimeter defined by the outside of the reservoirs 34, 36, 38, 40 to provide a sufficient volume of hot water for the heat exchange basins. For the remainder of this disclosure, reservoir 30 will be referred to as the first hot water reservoir and reservoir 32 will be referred to as the second hot water reservoir.

Reservoirs 34, 36, 38 and 40 are covered by airfoil portion 24 and are therefore cooled by the prevailing winds. These cold fluid reservoirs are preferably, but not necessarily, L-shaped and surround the hot fluid reservoirs. The walls separating hot and cold reservoirs should minimize heat transfer therebetween. For the remainder of this disclosure, reservoir 34 will be known as the first cold fluid reservoir, reservoir 36 will be known as the second cold fluid reservoir, reservoir 38 will be known as the third cold fluid reservoir and reservoir 40 will be known as the fourth cold fluid reservoir.

Also part of the fluid tank structure is a first heat exchange basin 42 and a second heat exchange basin 44. The basins are provided with a plurality of one-way valve devices, such as check valves, including a first valve device 46, a second valve device 48, a third valve device 50 and a fourth valve device 52. The valve devices allow fluid to flow in and out of the basin from the fluid reservoirs. That portion of any heat exchange basin beneath an airfoil portion of the cover should be closed by a wall to the wind to prevent heat loss thereto. Heat transfer is to be maximized from the basins to a heat exchange coil therein and minimized to the walls of the basin.

When the tank is rocked between the first position 14 and the second position 16 by means of a small motor M and a cam linkage C, the aforementioned valve devices open and close in a regular pattern so that heat exchange basins 42 and 44 are alternately flooded with hot and cold fluid.

In step-by-step operation, when the fluid tank is in the first position, reservoirs 30, 34 and 38, which are all on a first side of axis A, are lowered beneath reservoirs 32, 36 and 40, which are all in the second side of axis A. This results in the fluid that is within the reservoirs on the second side of the axis to flow towards the reservoirs on the first side of the axis. When this happens, valve devices 46, 48, and 54 all open so that hot fluid flows through heat exchange basin 42, cold fluid flows through heat exchange basin 44, and cold fluid flows from reservoir 36 to reservoir 34. The flow of fluid is indicated in FIG. 4 by the arrows labeled "1."

When the fluid tank is rocked into the second position, valves 50, 52 and 56 open allowing cold fluid to flow through heat exchange basin 42, hot fluid to flow through heat exchange basin 44 and cold fluid to flow from reservoir 38 back into reservoir 40. This fluid flow is shown in FIG. 4 by the arrows labeled "2."

Thus, by introducing a simple harmonic rocking motion to the fluid tank, heat exchange basins 42 and 44 will alternately be flooded with fluid that is heated and then flooded with fluid that is cooled. The motor M and camming linkage C can be adjusted so that the frequency of the rocking of the tank is optimized for a particular climate and area.

Figure 5:
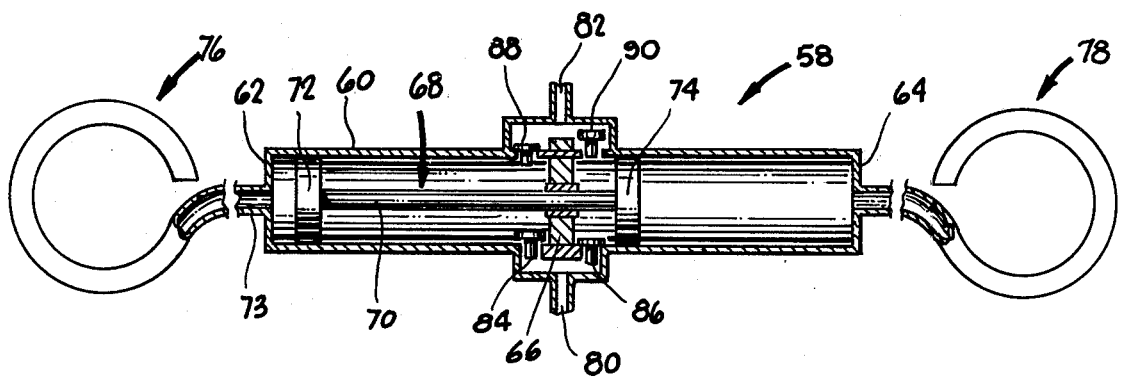
FIG. 5 is a cross-sectional view of a hydraulic pump used in the device of the present invention.

A hydraulic fluid pump 58 for producing a supply of pressurized hydraulic fluid is shown in FIG. 5. The pump includes a hollow body 60 having sealed ends 62 and 64 and a sealing inner partition 66. Disposed within the body of the pump is a piston 68 having a shaft 70 which is slideably disposed through a sealed aperture formed through partition 66, and a pair of heads 72 and 74 which each seal along the inner walls of hollow body 60. Heads 72, 74 are connected by a piston 68.

End 62 of the pump is connected to a heat exchange coil 76 which is at least partially, and preferably totally, disposed within heat exchange basin 42 so that it is covered by fluid. Trapped within heat exchange coil 76 is a volatile working fluid, such as carbon dioxide, carbon tetrachloride or ammonia, which have vapor pressures that can drive piston 68 to the right when heated and which can pull piston 68 to the left when cooled.

Similarly, attached to end 64 of the pump is a heat exchange coil 78 that is at least partially, and preferably totally, disposed within heat exchange basin 44 so that it is covered by fluid. Coil 78 also contains a volatile working fluid, of the same type as coil 76, having a temperature dependent vapor pressure which can drive piston 68 back and forth. The coils are constructed from a highly heat conductive material, such as copper, so that heat is quickly transferred from the fluid within the heat transfer basins to the volatile fluids within the coils.

In summary, when coil 76 is heated and coil 78 cooled, piston 68 is pushed/pulled to the right and when coil 76 is cooled and coil 78 is heated, piston 68 is pushed/pulled to the left. A temperature difference between the hot and cold reservoirs of only 5 degrees F. will operate the pump but a temperature difference of 20 degrees F. is preferable for high efficiency performance.

Attached to the hollow body of the pump is a hydraulic fluid inflow coupling 80, which connects the inflow of the pump to a reservoir of hydraulic fluid, and a hydraulic fluid outflow coupling 82. A pair of one-way inlet valves 84 and 86 prevent hydraulic fluid from flowing out of the body of the pump and a pair of outlet valves 88 and 90 prevent hydraulic fluid from flowing into the body of the pump. Valves 84 and 88 open on one side of barrier 66 and valves 86 and 90 open on the other side.

When piston 68 is driven to the left by the vapor pressure of the volatile fluids, hydraulic fluid is drawn through inlet valve 84 into the interior of the hollow body. As the piston is then forced to the right, the hydraulic fluid is forced through valve 88 and out outflow coupling 82. Simultaneously, as the piston is driven to the right, hydraulic fluid is drawn through valve 86 into the hollow body 60 and then expelled through valve 90 as the piston is again driven to the left. The push/pull action of the piston produces virtually a constant supply of pressurized hydraulic fluid at outflow coupling 82 of the pump.

Figure 6:
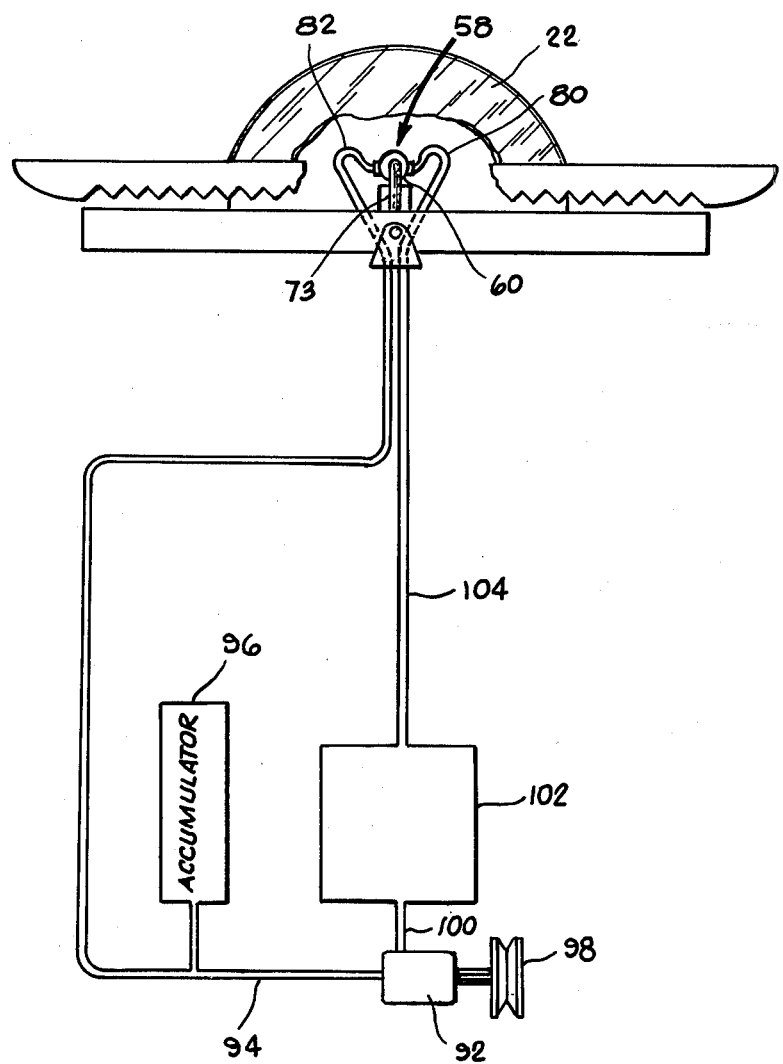
FIG. 6 is a diagram illustrating the operation of the device of this invention.

How this pressurized supply of fluid can be used to power a hydraulic motor is best seen in the diagram of FIG. 6. Preferably, hydraulic pump 58 is positioned beneath dome portion 22 so that the volatile fluid within heat exchange coils 68 and 80 will, when condensed, flow under gravitational influence down into the bottom of the coils. In this figure, a hydraulic motor 92 is shown to be coupled to outflow coupling 82 of pump 58 by a fluid carrying line 94. An intake/outlet pipe 73 connects one of the heat exchange coils in a heat exchange basin to the pump body 60. A similar pipe on the opposite end of the body, not shown, is connected to the other heat exchange basin. An accumulator 96 is also coupled to line 94 to prevent dangerous overpressurization of the hydraulic fluid. The pressurized hydraulic fluid then flows through motor 92 to cause the motor's shaft to turn and pulley 98 to rotate. The outflow of motor 92 is coupled by a fluid carrying line 100 to a hydraulic fluid reservoir 102 which is, in turn, coupled by a hydraulic fluid line 104 to the inflow coupling 80 of pump 58, completing the fluid cycle. The pulley of the motor can be coupled to a mechanical water pump, an electrical generator or other device so that useful work can be performed.

As best seen in FIG. 1, the device of the preferred embodiment is preferably oriented with respect to local terrain to maximize wind flow under the airfoils. This is to obtain the maximum cooling effect from the wind. A second embodiment of this invention uses a circularly designed cover and tank to create a device which need not be oriented in any particular direction.

Figure 7:
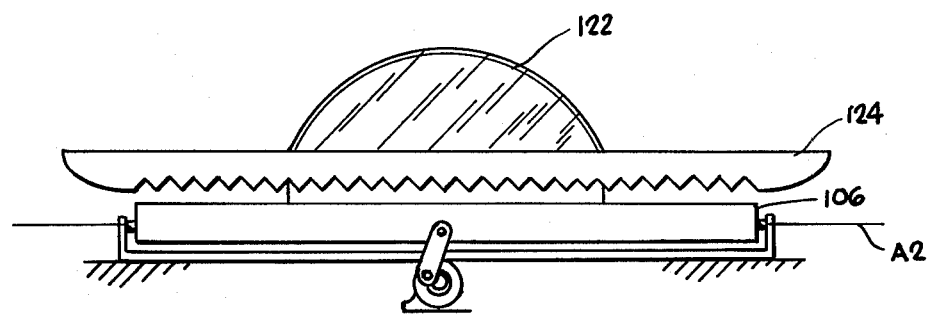
FIG. 7 is a side elevational view of a second embodiment of the present invention.
Figure 8:
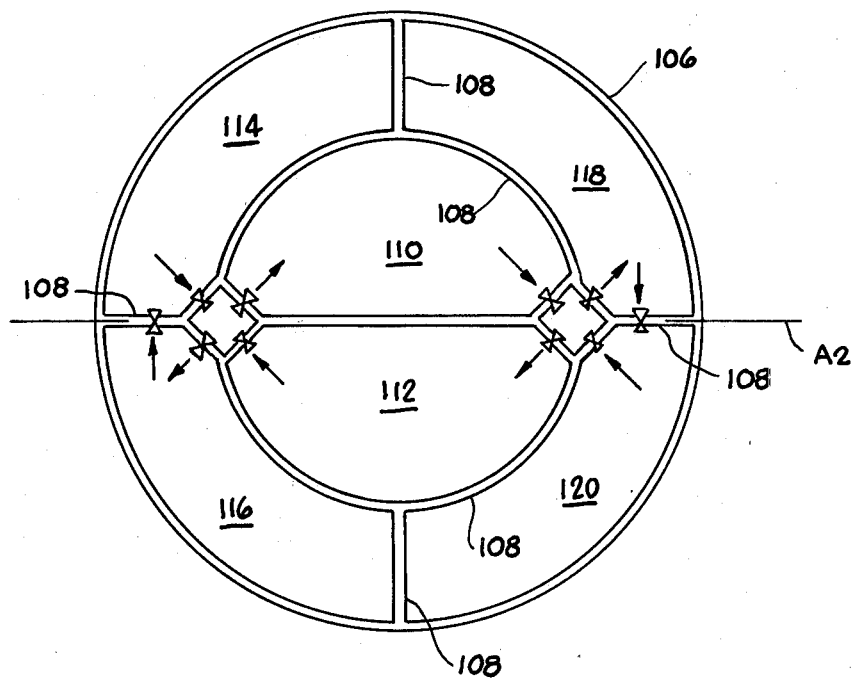
FIG. 8 is a plan view of the fluid tank of the device shown in FIG. 7.

The second embodiment of the present invention can be discussed with reference to FIGS. 7 and 8. In this embodiment, fluid tank 106 is circular and is partitioned by a plurality of walls 108 into six reservoirs 110, 112, 114, 116, 118 and 120. Reservoirs 110 and 112 are covered by a translucent or otherwise heat trapping dome portion 122 and thus contain hot fluid and reservoirs 114, 116, 118, 120 are covered by hollow airfoil portion 124 and thus contain cold fluid. The hot fluid reservoirs have at least one third of the area bounded by the outer circumference of the cold fluid reservoirs. The cambered surface of airfoil 124 is rippled to produce the same effect as corrugated portion 26 of the preferred embodiment, i.e., to create air turbulence to increase the amount of heat energy carried away from the cold fluid reservoirs.

The operation of the alternate embodiment is identical to that of the preferred embodiment and thus will not be discussed separately. It should be noted, however, that the device of the second embodiment will work equally well when pointing in any wind direction due to its symmetrical design.

The dome which was described as positioned over the hot fluid reservoirs is not essential for all operating conditions, as mentioned previously. For example, at night there may be a sufficient heat difference between the hot fluid reservoirs and the cold to provide power out. The cover over the hot fluid reservoirs should have good heat trapping properties.

The apparatus of the present invention need not be constructed in a rectangular or circular shape. A polygonal shape, such as an octagonal shape with sides of equal length may be used and in some instances may be preferable for ease of on-site construction. A regular polygonal shaped device having six or more sides would have an overall geometry similar to a circular geometry.

What is claimed is:
1. A solar and wind energized power generation device comprising,
    cold fluid reservoir means containing a first body of fluid,
    hot fluid reservoir means containing a second body of fluid,
    cover means covering said cold fluid reservoir means and said hot fluid reservoir means, said cover means including a heat trapping portion which confines heat in said second body of fluid and an airfoil portion which can direct wind past said cold fluid reservoir means to cool said first body of fluid, and
    heat exchange means for converting the thermal energy residing in the temperature difference between said first body of fluid and said second body of fluid into mechanical energy capable of performing useful work.
2. The apparatus of claim 1 wherein said heat exchange means comprises,
    a pair of heat exchange basins,
    means for alternately flooding said heat exchange basins with at least a portion of said first body of fluid and then at least a portion of said second body of fluid so that said one of said heat exchange basins is flooded from said cold fluid reservoir means, while the other is flooded from the hot fluid reservoir means, a pair of heat exchange coils disposed within the fluid flooding each of said heat exchange basins, said heat exchange coils containing a volatile fluid having a vapor pressure dependent upon its temperature, hydraulic pump means coupled to said heat exchange coils, said pump means being responsive to vapor pressure differences of said volatile fluid to perform useful work.

3. The apparatus of claim 2 wherein said cold fluid reservoir means includes a first cold fluid reservoir on a first side of an axis and a second cold fluid reservoir on a second side of said axis, and said hot fluid reservoir means includes a first hot fluid reservoir on said first side of said axis and a second hot fluid reservoir on said second side of said axis.

4. The apparatus of claim 3 wherein said means for alternately flooding said heat exchange basin comprises, means for pivoting said cold fluid reservoir means and said hot fluid reservoir means about said axis between a first position on the one hand, where said second cold fluid reservoir and said second hot fluid reservoir are elevated relative said first cold fluid reservoir and said first hot fluid reservoir, and a second position on the other hand, where said first cold fluid reservoir and said first hot fluid reservoir are elevated relative said second cold fluid reservoir and said second hot fluid reservoir, and valve means for permitting fluid to flow from said second hot fluid reservoir to said first hot fluid reservoir through said heat exchange basin when said hot reservoir means and said cold reservoir means are in said first position, and for permitting fluid to flow from said first cold fluid reservoir to said second cold fluid reservoir through said heat exchange basin when said hot reservoir means and said cold reservoir means are in said second position.

5. The apparatus of claim 1 wherein said hot fluid reservoir is disposed within said cold fluid reservoir.

6. The apparatus of claim 5 wherein the outside perimeter of said cold fluid reservoir is rectangular.

7. The apparatus of claim 5 wherein the outside perimeter of said cold fluid reservoir is round.

8. A solar and wind energized power generation device comprising:

(a) fluid tank means defining a pivotal axis, said fluid tank means having, a first hot fluid reservoir on a first side of said pivotal axis, a second hot fluid reservoir on a second side of said pivotal axis, a first cold fluid reservoir on said first side, a second cold fluid reservoir on said second side, a first heat exchange basin, first valve means for only permitting fluid to flow from said second hot fluid reservoir to said first hot fluid reservoir through said first heat exchange basin when said fluid tank is pivoted around said axis to a first position where said second side is elevated relative to said first side, second valve means for only permitting fluid to flow from said second cold fluid reservoir directly into said first cold fluid reservoir when said fluid tank means is in said first position, third valve means for only permitting fluid to flow from said first hot fluid reservoir to said second hot fluid reservoir when said fluid tank means is pivoted around said axis to a second position where said first side is elevated relative to said second side, and fourth valve means for only permitting fluid to flow from said first cold fluid reservoir to said second cold fluid reservoir through said first heat exchange basin when said fluid tank means is in said second position;

(b) a fluid disposed within said fluid tank means;

(c) means connected to said fluid tank means for alternately pivoting said fluid tank means between said first and said second position;

(d) a first sealed heat exchange coil containing a volatile fluid and disposed within the fluid in said first heat exchange basin;

(e) a third cold fluid reservoir located on said first side, (f) a fourth cold fluid reservoir located on said second side, (g) a second heat exchange basin means coupled to said third valve means so that fluid flows from said first hot fluid reservoir to said second hot fluid reservoir through said second heat exchange basin means when said fluid tank means is in said second position, (h) fifth valve means that only permits fluid to flow from said fourth cold fluid reservoir to said third cold fluid reservoir through said second heat exchange basin means when said tank means is in said first position, (i) sixth valve means that only permits fluid to flow directly from said third cold fluid reservoir into said fourth cold fluid reservoir when said tank means is in said second position, and (j) a second, sealed heat exchange coil containing a volatile fluid, said second coil being disposed within the fluid in said second heat exchange basin and coupled to said pump means, and (k) pump means coupled to said first and second heat exchange coils and responsive to changes in vapor pressure of said volatile fluid between said coils to do work.

9. A device as recited in claim 8 further comprising, a heat trapping cover means disposed over at least a portion of said tank means whereby the fluid within said hot fluid reservoirs is heated by solar energy radiating through said cover means.

10. A device as recited in claim 8 further comprising, airfoil means disposed over said cold fluid reservoirs for increasing the speed of the air flowing over said cold fluid reservoirs whereby the flowing air removes heat from the fluid within said cold fluid reservoirs.

11. A device as recited in claim 8 wherein said pump means comprises, a hollow body having sealed ends and a centrally positioned sealing barrier, a piston having a shaft slideably disposed through a sealed aperture in said barrier and having a first piston head attached to a first end of said shaft and a second piston head attached to a second end of said shaft, first means for coupling said first heat exchange coil to said first sealed end of said body so that the vapor of said volatile fluid fills the volume between said first sealed end and said first piston head, second means for coupling said second heat exchange coil to said second sealed end of said body so that the vapor pressure of said volatile fluid fills the volume between said second sealed end and said second piston head, inlet check valve means coupled to said body and opening on the volumes of space between said barrier and said piston heads, and outlet check valve means coupled to said body and opening on the volumes of space between said barrier and said piston heads.

12. The device of claim 8 wherein said hot fluid reservoir is disposed within said cold fluid reservoir.

13. The device of claim 12 wherein the outside perimeter of said cold fluid reservoir is rectangular.

14. The device of claim 12 wherein the outside perimeter of said cold fluid reservoir is round.

15. The device of claim 12 wherein the outside perimeter of said cold fluid reservoir is square.

16. A fluid filled fluid tank defining a pivotal axis for use with a power generation device comprising, a first hot fluid reservoir on a first side of said pivotal axis, a second hot fluid reservoir on a second side of said pivotal axis, a first cold fluid reservoir on said first side, a second cold fluid reservoir on said second side, a first heat exchange basin, first valve means for only permitting fluid to flow from said second hot fluid reservoir to said first hot fluid reservoir through said first heat exchange basin where said fluid tank is pivoted around said axis to a first position where said second side is elevated relative to said first side, second valve means for only permitting fluid to flow from said second cold fluid reservoir directly into said first cold fluid reservoir when said fluid tank means is in said first position, third valve means for only permitting fluid to flow from said first hot fluid reservoir to said second hot fluid reservoir when said fluid tank means is pivoted around said axis to a second position where said first side is elevated relative to said second side, fourth valve means for only permitting fluid to flow from said first cold fluid reservoir to said second cold fluid reservoir through said first heat exchange basin when said fluid tank means is in said second position and means for alternately pivoting said fluid tank means between said first and said second position, a third cold fluid reservoir located on said first side, a fourth cold fluid reservoir located on said second side, a second heat exchange basin means coupled to said third valve means so that fluid flows from said first hot fluid reservoir to said second hot fluid reservoir through said second heat exchange basin means when said fluid tank means is in said second position, fifth valve means that only permits fluid to flow from said fourth cold fluid reservoir to said third cold fluid reservoir through said second heat exchange basin means when said tank means is in said first position, sixth valve means that only permits fluid to flow directly from said third cold fluid reservoir into said fourth cold fluid reservoir when said tank means is in said second position, and a second, sealed heat exchange coil containing a volatile fluid, said second coil being disposed within said second heat exchange basin and coupled to said hydraulic fuel pump means.

17. A fluid tank as recited in claim 16 further comprising, a solar heat trapping cover means disposed over at least a portion of said tank means whereby the fluid within said hot fluid reservoirs is heated by solar energy radiating through said cover means.

18. A fluid tank as recited in claim 16 wherein said cover means further includes an airfoil portion positioned over said cold fluid reservoirs for increasing the speed of the air flowing over said cold fluid reservoirs whereby the rapidly flowing air removes heat from the fluid within said cold fluid reservoirs.

19. A fluid tank as recited in claim 18 wherein, said airfoil portion has a cambered surface provided with a plurality of turbulence promoting surface irregularities, whereby said irregular, cambered surface accelerates and directs the prevailing winds across the fluid stored in said cold fluid reservoirs.

20. A fluid tank as recited in claim 18 wherein said hot fluid reservoir is disposed within said cold fluid reservoir.

21. A fluid tank as recited in claim 20 wherein the outside perimeter of said cold fluid reservoir is rectangular.

22. A fluid tank as recited in claim 20 wherein the outside perimeter of said cold fluid reservoir is round.

* * * * *